Patented Mar. 16, 1926.

1,577,201

UNITED STATES PATENT OFFICE.

GUSTAV BAUM, OF WEISSENSTEIN, AUSTRIA.

PROCESS FOR THE DISTILLATION OF PERSULPHURIC ACID AND OF SOLUTIONS OF PERSULPHURIC-ACID SALTS.

No Drawing.      Application filed May 5, 1924. Serial No. 711,242.

*To all whom it may concern:*

Be it known that I, GUSTAV BAUM, a citizen of the Republic of Austria, residing at Weissenstein ob der Drau, Austria, have invented certain new and useful Improvements in a Process for the Distillation of Persulphuric Acid and of Solutions of Persulphuric-Acid Salts, of which the following is a specification.

It is known to warm, concentrate and distil liquids by heating them by means of alternating current so that the liquids themselves are used as a resistance. It is moreover known that electrolytic processes are eliminated by the use of high-frequency currents, the number of alternations being at least 500 per second.

According to my invention the liquid is heated directly with the aid of alternating current, for distilling persulphuric acid and solutions of persulphuric acid salts. This possibility was by no means obvious, since persulphuric acid is extremely sensitive to electric and other actions. This is all the more surprising that it is possible to distil persulphuric acid with a good yield by heating the liquid with the aid of alternating current, the number of alternations of which is far below 500 per second. In fact a number of alternations of 50 per second is sufficient when carbon electrodes are used. The frequency must be higher to avoid electrolytic decompositions when using platinum electrodes. The explanation of this important difference lies in the dissimilar speed at which the separation potential is reached in accordance with the nature of the electrodes.

Moreover, I have found that it is suitable to lixiviate the carbon electrodes with persulphuric acid for a period of time before they are used. Persulphuric acid does not alter at all coming in contact with carbon thus preliminarily treated, so that the yield of distillation is increased thereby.

As regards the intensity of the current, it is advisable to keep it below one ampere per square centimetre. Under the supply of current, the temperature of the electrodes should not rise above that of boiling persulphuric acid the adjustment of temperature being effected by regulating the speed, at which the liquid passes. The distillation process may be continuous by using a number of apparatus-units. The distillation apparatus unit may be made larger than usual and of inexpensive material (such as stoneware) in the heating of the liquid directly with alternating current in connection with the distillation of persulphuric acid and solutions of its salts. Additional advantages are a more easily maintained and more favourable vacuum and a better heat effect.

I use the term "a persulphuric acid body" to include not only the free persulphuric acid itself, but also solutions of salts of persulphuric acid.

What I claim is:

1. In the process for the distillation of a persulphuric acid body the step which comprises directly heating the liquid by means of alternating current, the alternations of which are lower than 500 per second.

2. In the process for the distillation of a persulphuric acid body the step which comprises directly heating the liquid by means of alternating current, the alternations of which are lower than 500 per second, and using thereby carbon electrodes.

3. In the process for the distillation of a persulphuric acid body the step which comprises directly heating the liquid by means of alternating current, the alternations of which are lower than 500 per second, carbon electrodes being used which have preliminarily been lixiviated with persulphuric acid.

4. A process for the distillation of a persulphuric acid body consisting in directly heating the liquid by means of alternating current, the alternations of which are lower than 500 per second, while using carbon electrodes which have preliminarily been lixiviated with persulphuric acid, the intensity of the current being kept below one ampere per square centimetre.

5. A process for the continuous distillation of a persulphuric acid body consisting of directly heating the liquid in a number of apparatus-units by means of alternating current, the alternations of which are lower than 500 per second, while using carbon electrodes which have preliminarily been lixiviated with persulphuric acid, the intensity of the current being kept below one ampere per square centimetre.

6. A process for the continuous distillation of a persulphuric acid body consisting of directly heating the liquid in a number of apparatus-units made of stone-ware, by means of alternating current, the alternations of which are lower than 500 per second, while using carbon electrodes which have preliminarily been lixiviated with persulphuric acid, the intensity of the current being kept below one ampere per square centimetre.

In testimony whereof I have affixed my signature.

GUSTAV BAUM.